United States Patent
Weng et al.

(10) Patent No.: US 12,514,512 B2
(45) Date of Patent: Jan. 6, 2026

(54) MONITORING DEVICE FOR PHYSIOLOGICAL SIGNAL MONITORING AND OPERATION METHOD THEREOF

(71) Applicant: Industrial Technology Research Institute, Hsinchu (TW)

(72) Inventors: Hsuan-Chi Weng, Hsinchu (TW); Chin-Hung Wang, Hsinchu (TW); Wei Li, Hsinchu (TW); Chia-Chung Liu, Taipei (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 577 days.

(21) Appl. No.: 17/688,467

(22) Filed: Mar. 7, 2022

(65) Prior Publication Data

US 2023/0172561 A1 Jun. 8, 2023

(30) Foreign Application Priority Data

Dec. 3, 2021 (TW) .................. 110145144

(51) Int. Cl.
*A61B 5/00* (2006.01)

(52) U.S. Cl.
CPC .......... *A61B 5/7271* (2013.01); *A61B 5/0059* (2013.01); *A61B 5/681* (2013.01);
(Continued)

(58) Field of Classification Search
CPC .......... A61B 2560/0266; A61B 5/0059; A61B 5/14552; A61B 5/681; A61B 5/6817; A61B 5/6898; A61B 5/7271
See application file for complete search history.

(56) References Cited

U.S. PATENT DOCUMENTS 8,942,776 B2 1/2015 LeBoeuf et al.
10,433,739 B2 10/2019 Weekly et al.
(Continued)

FOREIGN PATENT DOCUMENTS

CN 105266759 A 1/2016
CN 111248889 A 6/2020
(Continued)

OTHER PUBLICATIONS

Taiwanese Office Action and Search Report for Taiwanese Application No. 110145144, dated Mar. 8, 2023.
(Continued)

*Primary Examiner* — Michael T Rozanski
(74) *Attorney, Agent, or Firm* — Birch, Stewart, Kolasch & Birch, LLP

(57) ABSTRACT

A monitoring device for physiological signal monitoring includes a first light receiving and transmitting device and a control device. The first light receiving and transmitting device generates a first light signal to an object and receives a second light signal to generate a first electrical signal. The control device controls the first light receiving and transmitting device to generate the first light signal in a first period, and controls the first light receiving and transmitting device to receive the second light signal to generate the first electrical signal in a second period. The invention further includes an operating method for physiological signal monitoring.

20 Claims, 7 Drawing Sheets

(52) U.S. Cl.
CPC .......... *A61B 5/6817* (2013.01); *A61B 5/6898* (2013.01); *A61B 2560/0266* (2013.01)

(56) References Cited

U.S. PATENT DOCUMENTS

| | | |
|---|---|---|
| 10,966,643 B1 | 4/2021 | Vavadi et al. |
| 2014/0249390 A1 | 9/2014 | Bernreuter |
| 2016/0360974 A1 | 12/2016 | Lange |
| 2017/0296075 A1 | 10/2017 | Loseu et al. |
| 2018/0296854 A1* | 10/2018 | Grob .................... A61N 5/0616 |
| 2018/0353074 A1 | 12/2018 | Kruiskamp |
| 2020/0275844 A1 | 9/2020 | Yuen et al. |
| 2020/0375547 A1 | 12/2020 | Walter et al. |
| 2021/0196980 A1 | 7/2021 | Howard |

FOREIGN PATENT DOCUMENTS

| | | |
|---|---|---|
| CN | 213043825 U | 4/2021 |
| TW | I473447 B | 2/2015 |
| TW | 201517869 A | 5/2015 |
| TW | 201615151 A | 5/2016 |
| TW | 201722348 A | 7/2017 |
| TW | 202021150 A | 6/2020 |
| TW | 202033152 A | 9/2020 |

OTHER PUBLICATIONS

Chinese Office Action and Search Report for Chinese Application No. 202111542777.7, dated Jul. 25, 2025.

* cited by examiner

MONITORING DEVICE FOR PHYSIOLOGICAL SIGNAL MONITORING AND OPERATION METHOD THEREOF

CROSS REFERENCE TO RELATED APPLICATIONS

This application claims priority of Taiwan Patent Application No. 110145144, filed on Dec. 3, 2021, the entirety of which is incorporated by reference herein.

TECHNICAL FIELD

The disclosure relates to a monitoring device, and relates to a monitoring device for physiological signal monitoring and an operation method thereof.

BACKGROUND

Most of the physiological monitoring devices currently in use have one or more light emitting diodes that serve as the signal source for sensing physiological signals. They also use at least one light sensor to receive the corresponding sensing signal. This is how they measure the physiological signal. However, the above structure may increase the volume of the physiological monitoring device, causing it to be inconvenient for the user. Therefore, how to effectively decrease the volume of the physiological monitoring device and increase the convenience of use has become a focus for technical improvements by various manufacturers.

SUMMARY

The disclosure provides a monitoring device for physiological signal monitoring, which includes a first light receiving and transmitting device and a control device. The first light receiving and transmitting device is configured to generate a first light signal to an object and receive a second light signal to generate a first electrical signal. The control device is configured to control the first light receiving and transmitting device to generate the first light signal in a first period, and control the first light receiving and transmitting device to receive the second light signal to generate the first electrical signal in a second period.

The disclosure provides an operation method of a monitoring device for physiological signal monitoring, which includes the following steps. A first light receiving and transmitting device is provided to generate a first light signal to an object and receive a second light signal to generate a first electrical signal. A control device is used to control the first light receiving and transmitting device to generate the first light signal in a first period. The control device is used to control the first light receiving and transmitting device to receive the second light signal to generate the first electrical signal in a second period.

BRIEF DESCRIPTION OF DRAWINGS

The disclosure can be more fully understood by reading the subsequent detailed description and examples with references made to the accompanying drawings, wherein.

DETAILED DESCRIPTION OF DISCLOSED EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, a person skilled in the art would selectively implement all or some technical features of any embodiment of the disclosure or selectively combine all or some technical features of the embodiments of the disclosure.

In each of the following embodiments, the same reference number represents the same or a similar element or component.

Figure 1:
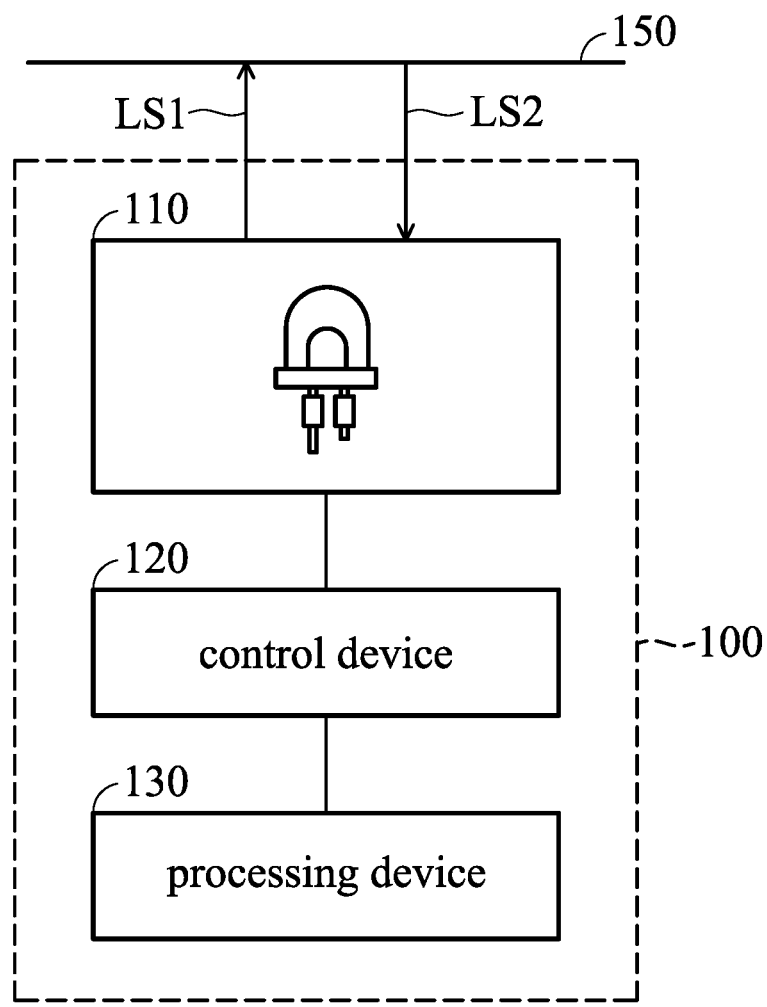
FIG. 1 is a schematic view of a monitoring device for physiological signal monitoring according to an embodiment of the disclosure.
Figure 2A:
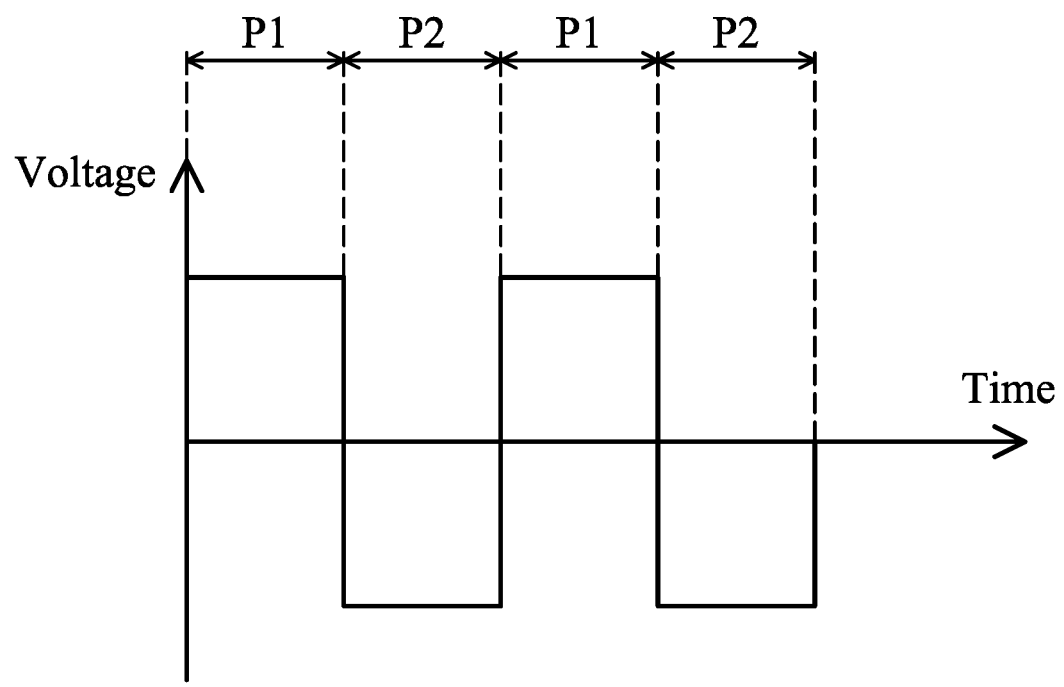
FIG. 2A is an operation timing diagram of a control device of a monitoring device for physiological signal monitoring according to an embodiment of the disclosure.
Figure 2B:
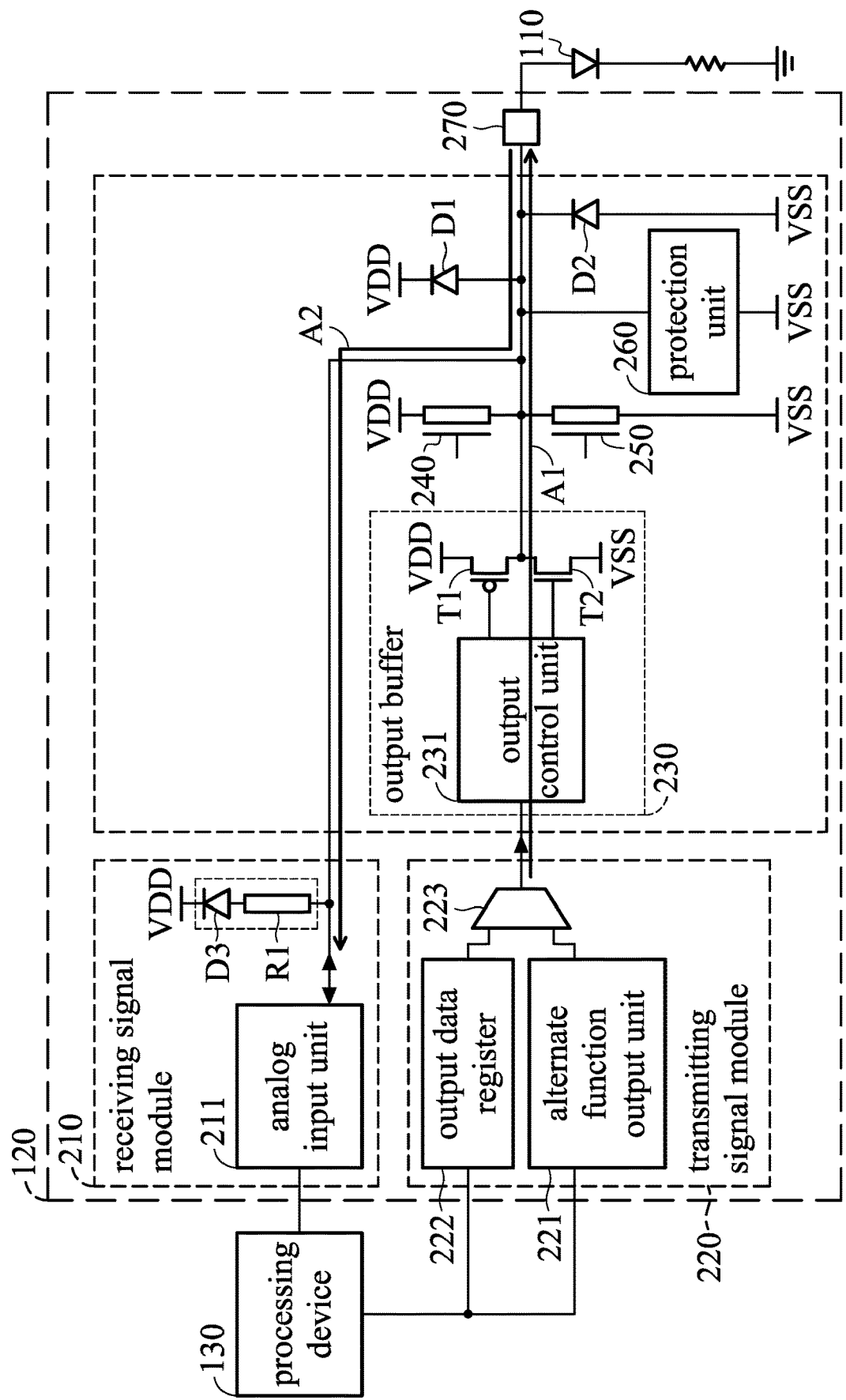
FIG. 2B is a schematic circuit diagram of a monitoring device for physiological signal monitoring according to an embodiment of the disclosure.

FIG. 1 is a schematic view of a monitoring device for physiological signal monitoring according to an embodiment of the disclosure. FIG. 2A is an operation timing diagram of a control device of a monitoring device for physiological signal monitoring according to an embodiment of the disclosure. FIG. 2B is a schematic circuit diagram of a monitoring device for physiological signal monitoring according to an embodiment of the disclosure. In the embodiment, the monitoring device 100 for physiological signal monitoring may be a physiological monitoring instrument, for example, it may sense physiological signals, such as blood oxygen, heartbeat, blood sugar, etc., but the embodiment of the disclosure is not limited thereto. Please refer to FIG. 1, FIGS. 2A and 2B. The monitoring device 100 for physiological signal monitoring may include a light receiving and transmitting device 110 and a control device 120.

The light receiving and transmitting device 110 may generate a first light signal LS1 to an object 150, and receive the second light signal LS2 to generate an electrical signal. In the embodiment, the light receiving and transmitting device 110 is, for example, a single light-emitting diode (LED) with a light-detection function. That is, the light receiving and transmitting device 110 may be a single light-emitting diode that may generate the light signal and receive the light signal, i.e., the light receiving and transmitting device 110 (the monitoring device 100 for physiological signal monitoring) does not include an additional single light detection element. For example, the light receiving and transmitting device 110 may generate light signals while in a light-emitting state, and the light receiving and transmitting device 110 may receive light signals while in a non-light-emitting state. Therefore, the volume of the monitoring device 100 for physiological signal monitoring may be effectively decreased.

In addition, in the embodiment, the second light signal LS2 is generated, for example, by the object 150 in response to the first light signal LS1. That is, the second light signal LS2 may be a reflected light or a scattered light generated by the first light signal LS1 irradiating the object 150, but the embodiment of the disclosure is not limited thereto. Furthermore, the magnitude of the electrical signal may be proportional to the light signal intensity of the second light signal LS2. That is, when the light signal intensity of the second light signal LS2 is larger, the magnitude of the electrical signal is larger. When the light signal intensity of the second light signal LS2 is smaller, the magnitude of the electrical signal is smaller.

The control device 120 is connected to the light receiving and transmitting device 110. As shown in FIG. 2A, in a first period P1, the control device 120 may provide, for example, a driving signal with a positive voltage level to control the light receiving and transmitting device 110 to generate the first light signal LS1 to the object 150. In a second period, the control device 120 may provide, for example, a driving signal with a negative voltage level to control the light receiving and transmitting device 110 to receive the second light signal LS2, so as to generate the electrical signal. In the embodiment, the first period P1 and the second period P2 are different periods, i.e., there is a time difference between the first period P1 and the second period P2. In addition, the above period P1 may be a period in which the light receiving and transmitting device 110 is in a light-emitting state, and the above second period P2 may be a period in which the light receiving and transmitting device 110 is in a non-light-emitting state. That is, the monitoring device 100 for physiological signal monitoring controls the light receiving and transmitting device 110 to perform one-transmitting and one-receiving through the control device 120 in different periods, so as to increase the accuracy of monitoring. In the embodiment, the control device 120 may be a micro controller unit (MCU), a complex programmable logic device (CPLD), or other suitable controller, but the embodiment of the disclosure is not limited thereto.

In some embodiments, the control device 120 may include a receiving signal module 210, a transmitting signal module 220, an output buffer 230, an impedance element 240, an impedance element 250, a protection unit, 260, a diode D1, a diode D2 and an input/output pin 270, as shown in FIG. 2B. However, the internal circuit of the control device 120 shown in FIG. 2B is an exemplary embodiment of the control device 120 of the disclosure, and is not intended to limit the form of the internal circuit of the control device 120 of the disclosure.

The receiving signal module 210 includes an analog input unit 211, a diode D3 and a resistor R1. The diode D3 includes a first terminal and a second terminal. The first terminal (such as a cathode terminal) of the diode D3 is connected to a reference voltage VDD (such as an operation voltage). The resistor R1 includes a first terminal and a second terminal. The first terminal of the resistor R1 is connected to a second terminal (such as an anode terminal) of the diode D3. The second terminal of the resistor R1 is connected to the analog input unit 211.

The transmitting signal module 220 includes an alternate function output unit 221, an output data register 222 and a multiplexer 223. The multiplexer 223 is connected to the alternate function output unit 221 and the output data register 222.

The output buffer 230 includes an output control unit 231, a transistor T1 and a transistor T2. The output control unit 231 is connected to the multiplexer 223. The transistor T1 includes a first terminal, a second terminal and a third terminal. The first terminal of the transistor T1 is connected to the output control unit 231. The second terminal of the transistor T1 is connected to the reference voltage VDD (such as the operation voltage). In the embodiment, the transistor T1 is, for example, a P-type transistor, the first terminal of the transistor T1 is, for example, a gate terminal of the P-type transistor, the second terminal of the transistor T1 is, for example a source terminal of the P-type transistor, and the third terminal of the transistor T1 is, for example, a drain terminal of the P-type transistor.

The transistor T2 includes a first terminal, a second terminal and a third terminal. The first terminal of the transistor T2 is connected to the output control unit 231. The second terminal of the transistor T2 is connected to a reference voltage VSS (such as a ground voltage). The third terminal of the transistor T2 is connected to the third terminal of the transistor T1. In the embodiment, the transistor T2 is, for example, a N-type transistor, the first terminal of the transistor T2 is, for example, a gate terminal of the N-type transistor, the second terminal of the transistor T2 is, for example, a source terminal of the N-type transistor, and the third terminal of the transistor T2 is, for example, a drain terminal of the N-type transistor.

A first terminal of the impedance element 240 is connected to the reference voltage VDD (such as the operation voltage). A second terminal of the impedance element 240 is connected to the third terminal of the transistor T1 and the analog input unit 211. The impedance element 250 includes a first terminal and a second terminal. The first terminal of the impedance element 250 is connected to the second terminal of the impedance element 240. The second terminal of the impedance element 250 is connected to the reference voltage VSS (such as the ground voltage). The protection unit 260 includes a first terminal and a second terminal. The first terminal of the protection unit 260 is connected to the second terminal of the impedance element 240. The second terminal of the protection unit 260 is connected to the reference voltage VSS (such as the ground voltage or a negative voltage). In the embodiment, the protection unit 260 is, for example, an electrostatic discharge (ESD) protection circuit.

The diode D1 includes a first terminal and a second terminal. The first terminal (such as a cathode terminal) of the diode D1 is connected to the reference voltage VDD (such as the operation voltage). The second terminal (such as an anode terminal) of the diode D1 is connected to the second terminal of the impedance element 240. The diode D2 includes a first terminal and a second terminal. The first terminal (such as a cathode terminal) of the diode D2 is connected to the second terminal of the diode D1. The second terminal (such an anode terminal) of the diode D2 is connected to the reference voltage VSS (such as the ground voltage). The input/output pin 270 is connected to the second terminal of the impedance element 240 and the light receiving and transmitting device 110.

Please refer to FIGS. 2A and 2B. In an operation of the control device 120, in the first period P1, the control device 120 provides the transmitting driving signal through the alternate function output unit 221 or the output data register 222, the transmitting driving signal drives the elements of the transmitting signal circuit corresponding to a path A1, and the input/output pin 270 provides, for example, the driving signal with the positive voltage level to the light receiving and transmitting device 110, such that the light receiving and transmitting device 110 generate the first light signal LS1 to the object 150. Then, in the second period P2, the control device 120 does not provide the transmitting driving signal to control the input/output pin 270 to provide, for example, the driving signal with the negative voltage level, such that the light receiving and transmitting device 110 receives the second light signal LS2 to generate the electrical signal. Afterward, the electrical signal generated by the light receiving and transmitting device 110 is received through the input/output pin 270, and transmitted to the analog input unit 211 through the elements of the receiving signal circuit corresponding to a path A2. Then, the analog input unit 211 may output the electrical signal generated by the light receiving and transmitting device 110 to the back-end circuit for subsequent processing.

In the embodiment, the monitoring device 100 for physiological signal monitoring further includes a processing device 130. The processing device 130 is connected to the control device 120 (for example, the processing device 130 is connected to the analog input unit 211 of the receiving signal module 210 and the alternate function output unit 221 and the output data register 222 of the transmitting signal module 220). The processing device 130 may drive the control device 120 (such as the alternate function output unit 221 or the output data register 222 of the transmitting signal module 220) to provide a transmitting driving single in the first period P1, and the control device 120 may provide, for example, a driving signal with a positive voltage level to the light receiving and transmitting device 110, such that the light receiving and transmitting device 110 generates the first light LS1. In addition, the processing device 130 may drive the control device 120 (such as the alternate function output unit 221 or the output data register 222 of the transmitting signal module 220) to not provide the transmitting driving signal in the second period P2, and the control device 120 may provide, for example, a driving signal with a negative voltage level to the light receiving and transmitting device 110, such that the light receiving and transmitting device 110 receives the second light signal LS2 to generate the electrical signal. Then, the processing device 130 receives the electrical signal generated by the light receiving and transmitting device 110 through the control device 120 (such as the analog input unit 211 of the receiving signal module 210) for subsequent processing. Afterward, the processing device 130 may use an algorithm to process the above electrical signal to generate monitoring information. That is, the processing device 130 may use the algorithm to analyze the magnitude of the above electrical signal to generate the corresponding monitoring information.

In the embodiment, the above algorithm may include a smoothing method, a filtering method, an anomaly detection, a periodicity detection, photoplethysmography (PPG) or an artificial intelligence (AI) algorithm. In addition, the above monitoring information includes, for example, physiological information, such as such as blood oxygen, heartbeat, blood sugar, etc., but the embodiment of the disclosure is not limited thereto. Furthermore, the processing device 130 is, for example, a central processing unit (CPU), but the embodiment of the disclosure is not limited thereto.

Figure 3:
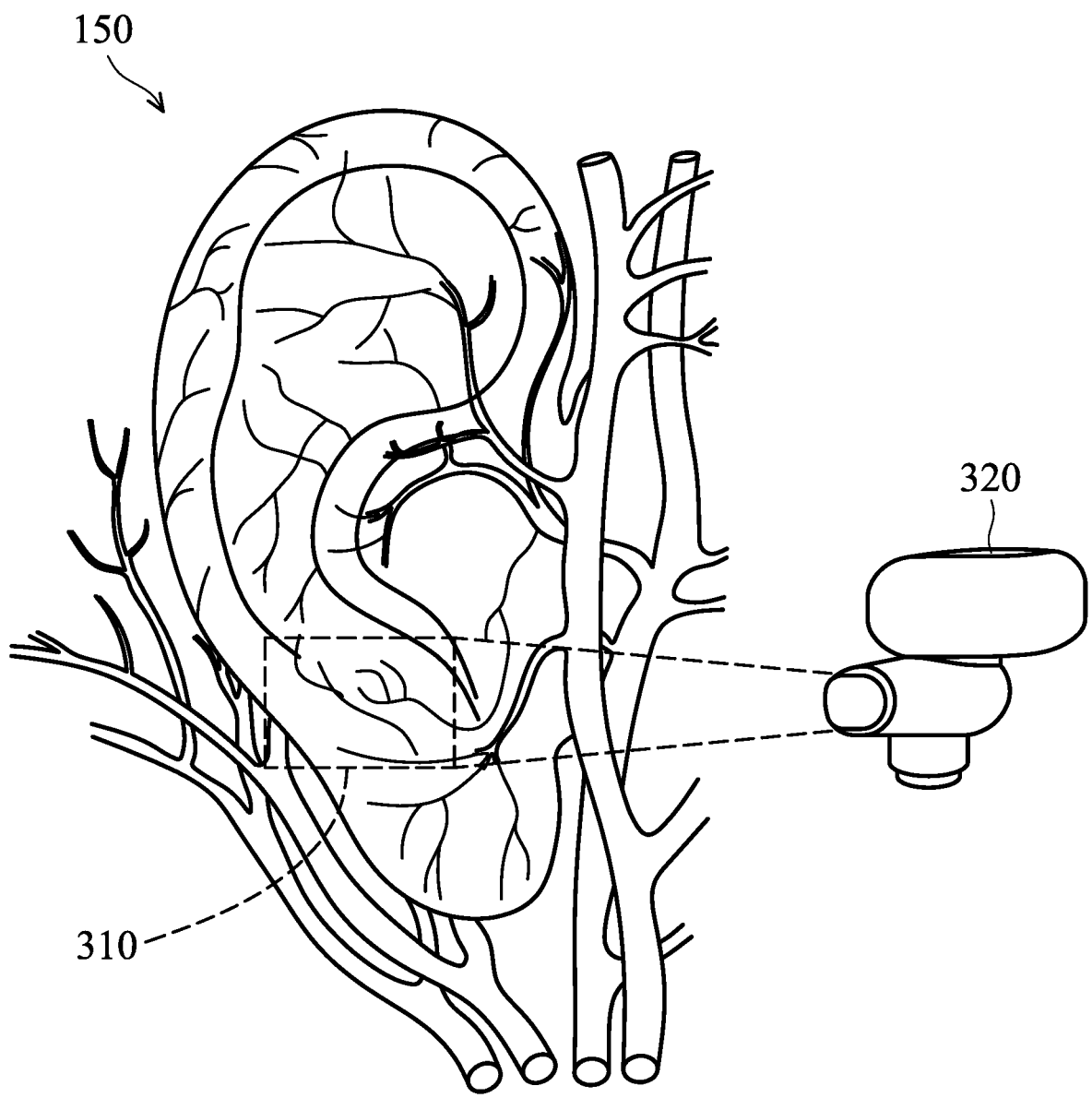
FIG. 3 is a schematic view of an object and an earphone according to an embodiment of the disclosure.

In some embodiments, the monitoring device 100 for physiological signal monitoring may be disposed on an earphone 320 (i.e., the monitoring device 100 for physiological signal monitoring is in the form of an earphone), and the object 150 is, for example, the ear of a user, as shown in FIG. 3. In addition, the monitoring device 100 for physiological signal monitoring may measure the monitoring information on the measurement area 310 shown in FIG. 3. Furthermore, the measurement area 310 is, for example, an antitragus, but the embodiment of the disclosure is not limited thereto. The measurement area 310 may also be another suitable area. In some embodiments, the monitoring device 100 for physiological signal monitoring may be disposed on a watch (i.e., the monitoring device 100 for physiological signal monitoring is in the form of a watch), and the object 150 is, for example, a hand of the user. That is, the monitoring device 100 for physiological signal monitoring may measure the monitoring information on the object 150 (such as the hand).

Figure 4:
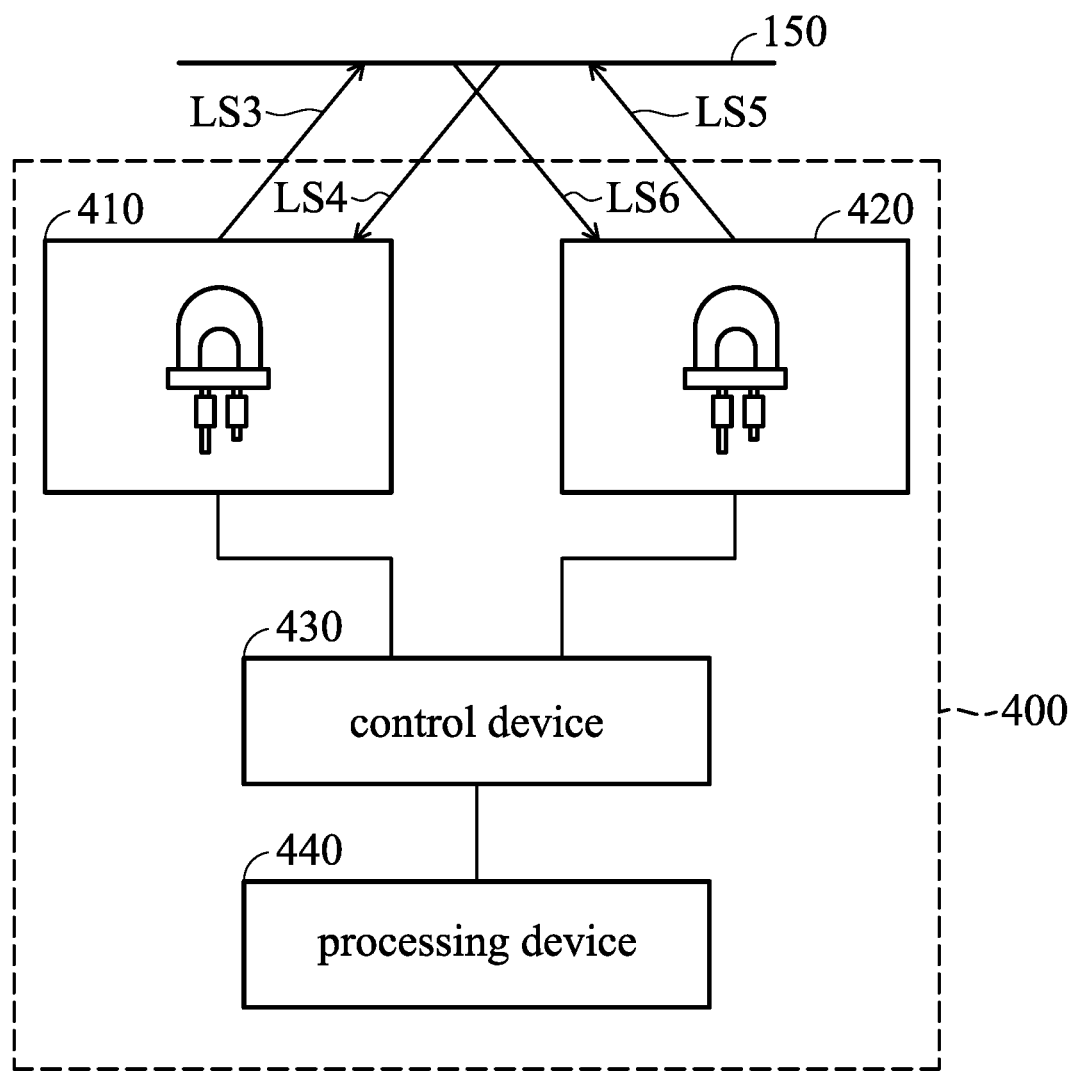
FIG. 4 is a schematic view of a monitoring device for physiological signal monitoring according to another embodiment of the disclosure.

FIG. 4 is a schematic view of a monitoring device for physiological signal monitoring according to another embodiment of the disclosure. In the embodiment, the monitoring device 400 for physiological signal monitoring may be a physiological monitoring instrument, for example, it may sense physiological signals, such as blood oxygen, heartbeat, blood sugar, etc., but the embodiment of the disclosure is not limited thereto. Please refer to FIG. 4. The monitoring device 400 for physiological signal monitoring may include a light receiving and transmitting device 410, a light receiving and transmitting device 420, a control device 430 and a processing device 440.

The light receiving and transmitting device 410 may generate a first light signal LS3 to the object 150, and receive a second light signal LS4 to generate a first electrical signal. The light receiving and transmitting device 420 may generate a third light signal LS5 to the object 150, and receive a fourth light signal LS6 to generate a second electrical signal. In the embodiment, each of the light receiving and transmitting device 410 and the light receiving and transmitting device 420 is, for example, a single light-emitting diode (LED) with a light-detection function at the same time. That is, each of the light receiving and transmitting device 410 and the light receiving and transmitting device 420 may be the single light-emitting diode that may generate the light signal and receive the light signal, i.e., each of the light receiving and transmitting device 410 and the light receiving and transmitting device 420 (the monitoring device 400 for physiological signal monitoring) does not include an additional single light detection element. Therefore, the volume of the monitoring device 400 for physiological signal monitoring may be effectively decreased.

In addition, in the embodiment, the second light signal LS4 is generated, for example, by the object 150 in response to the third light signal LS5, and the fourth light signal LS6 is generated, for example, by the object 150 in response to the first light signal LS3. That is, the second light signal LS4 may be a reflected light or a scattered light generated by the third light signal LS5 irradiating the object 150, and the fourth light signal LS6 may be a reflected light or a scattered light generated by the first light signal LS3 irradiating the object 150, but the embodiment of the disclosure is not limited thereto.

Furthermore, the magnitude of the first electrical signal may be proportional to the light signal intensity of the second light signal LS4. That is, when the light signal intensity of the second light signal LS4 is larger, the magnitude of the first electrical signal is larger. When the light signal intensity of the second light signal LS4 is smaller, the magnitude of the first electrical signal is smaller. Moreover, the magnitude of the second electrical signal may be proportional to the light signal intensity of the fourth light signal LS6. That is, when the light signal intensity of the fourth light signal LS6 is larger, the magnitude of the second electrical signal is larger. When the light signal intensity of the fourth light signal LS6 is smaller, the magnitude of the second electrical signal is smaller.

In the first period, the control device 430 may control the light receiving and transmitting device 410 to generate the first light signal LS3, and control the light receiving and transmitting device 420 to receive the fourth light signal LS6 (i.e., the fourth light signal LS6 is generated by the object 150 in response to the first light signal LS3), so as to generate the second electrical signal. In addition, in the second period, the control device 430 may control the light receiving and transmitting device 420 to generate the third light signal LS5, and control the light receiving and transmitting device 410 to receive the second light signal LS4 (i.e., the second light signal LS4 is generated by the object 150 in response to the third light signal LS5), so as to generate the first electrical signal.

In the embodiment, the first period and the second period are different periods. In addition, the above first period may be a period in which the light receiving and transmitting device 410 is in a light-emitting state and the light receiving and transmitting device 420 is in a non-light-emitting state, and the above second period may be a period in which the light receiving and transmitting device 410 is in a non-light-emitting state and the light receiving and transmitting device 420 is in a light-emitting state. That is, the monitoring device 400 for physiological signal monitoring alternately controls the light receiving and transmitting device 410 and the light receiving and transmitting device 420 to perform one-transmitting and one-receiving through the control device 430 in different periods, so as to increase the accuracy of monitoring. In the embodiment, the control device 430 is, for example, a micro control unit, but the embodiment of the disclosure is not limited thereto.

In the embodiment, the monitoring device 400 for physiological signal monitoring further includes a processing device 440. The processing device 440 is connected to the control device 430, and receives the first electrical signal generated by the light receiving and transmitting device 410 and the second electrical signal generated by the light receiving and transmitting device 420 through the control device 430. Then, the processing device 440 may use an algorithm to process the above first electrical signal and the above second electrical signal to generate monitoring information. That is, the processing device 440 may use the algorithm to analyze the magnitude of the first electrical signal and the magnitude of the second electrical signal to generate the corresponding monitoring information. In the embodiment, the above algorithm may include a smoothing method, a filtering method, an anomaly detection, a periodicity detection, photoplethysmography or an artificial intelligence algorithm. In addition, the above monitoring information includes, for example, physiological information, such as such as blood oxygen, heartbeat, blood sugar, etc., but the embodiment of the disclosure is not limited thereto. Furthermore, the processing device 440 is, for example, a central processing unit, but the embodiment of the disclosure is not limited thereto.

In some embodiments, the monitoring device 400 for physiological signal monitoring may be disposed on an earphone 320 (i.e., the monitoring device 400 for physiological signal monitoring is in the form of an earphone), and the object 150 is, for example, of an ear of the user, as shown in FIG. 3. In addition, the monitoring device 400 for physiological signal monitoring may measure the monitoring information on the measurement area 310 shown in FIG. 3, and the measurement area 310 is, for example, an anti-tragus, but the embodiment of the disclosure is not limited thereto.

In some embodiments, the monitoring device 400 for physiological signal monitoring may be disposed on a watch (i.e., the monitoring device 400 for physiological signal monitoring is in the form of a watch), and the object 150 is, for example, a hand of the user. That is, the monitoring device 400 for physiological signal monitoring may measure the monitoring information on the object 150 (such as the hand).

Figure 5:
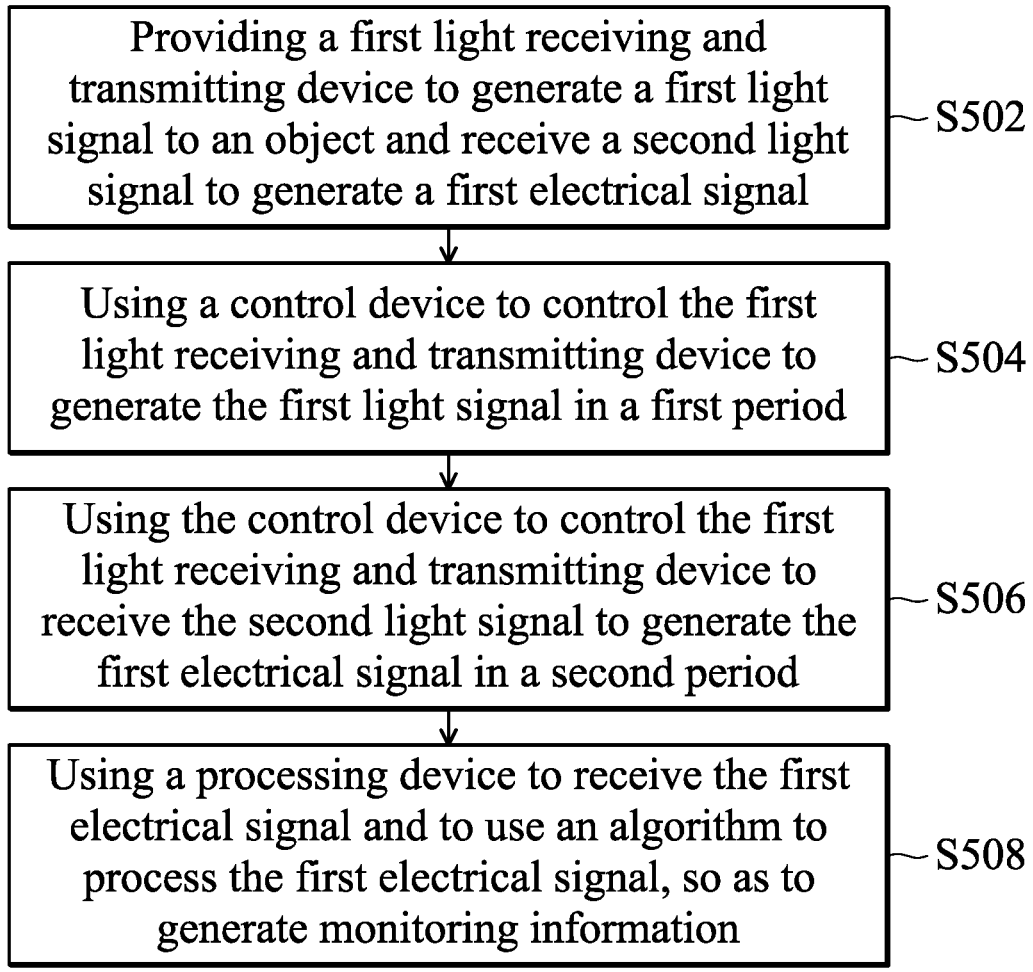
FIG. 5 is a flowchart of an operation method of a monitoring device for physiological signal monitoring according to an embodiment of the disclosure.

FIG. 5 is a flowchart of an operation method of a monitoring device for physiological signal monitoring according to an embodiment of the disclosure. The flowchart of the embodiment may correspond to the monitoring device 100 for physiological signal monitoring of FIG. 1. In step S502, the method involves providing a first light receiving and transmitting device to generate a first light signal to an object and receive a second light signal to generate a first electrical signal. In step S504, the method involves using a control device to control the first light receiving and transmitting device to generate the first light signal in a first period. In step S506, the method involves using the control device to control the first light receiving and transmitting device to receive the second light signal to generate the first electrical signal in a second period.

In step S508, the method involves using a processing device to receive the first electrical signal and to use an algorithm to process the first electrical signal, so as to generate monitoring information. In the embodiment, the second light signal is generated, for example, by the object in response to the first light signal. In addition, the first light receiving and transmitting device is, for example, a single light-emitting diode with a light-detection function. Furthermore, the above algorithm includes, for example, a smoothing method, a filtering method, an anomaly detection method, a periodicity detection method, photoplethysmography, or an artificial intelligence algorithm.

Figure 6:
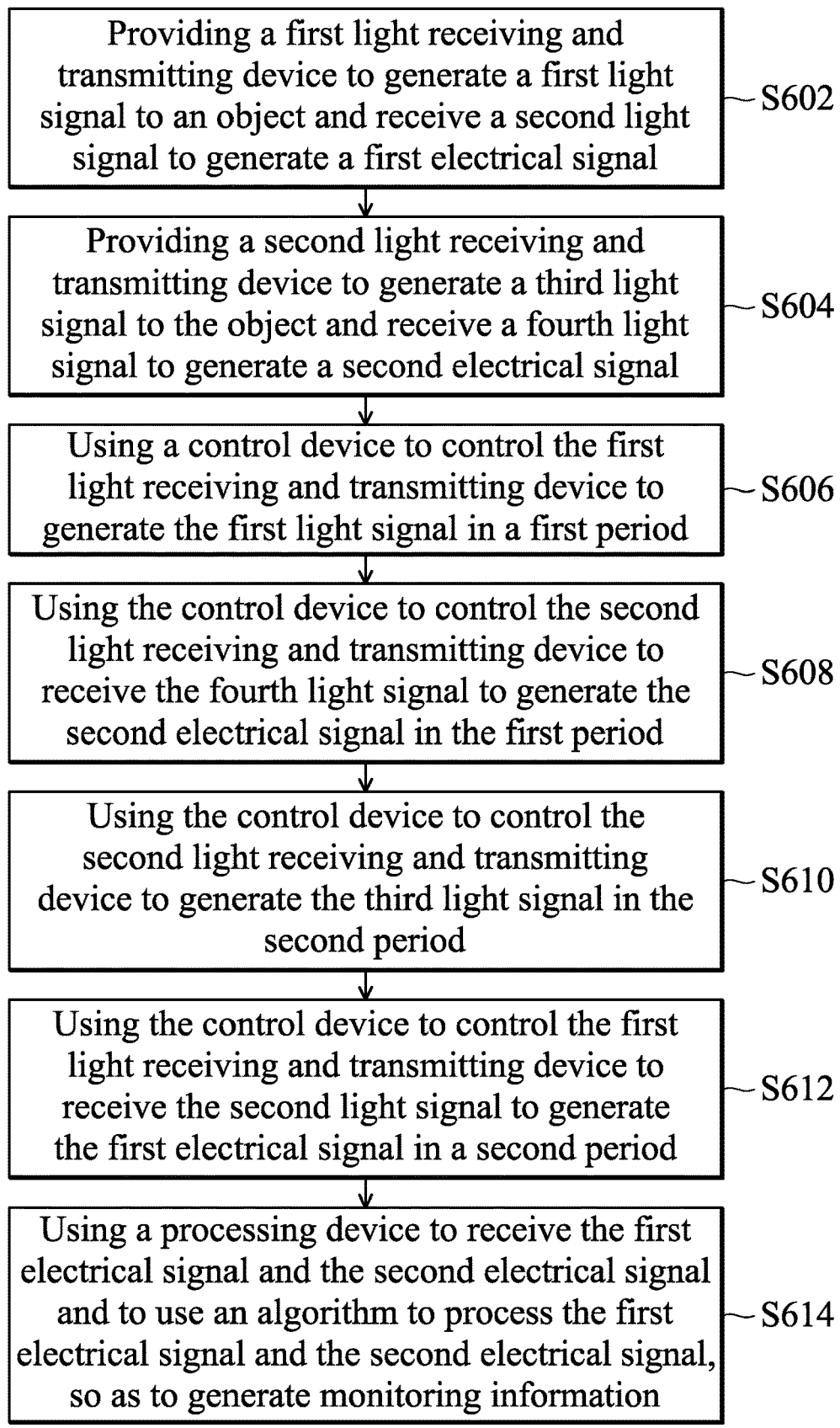
FIG. 6 is a flowchart of an operation method of a monitoring device for physiological signal monitoring according to another embodiment of the disclosure.

FIG. 6 is a flowchart of an operation method of a monitoring device for physiological signal monitoring according to another embodiment of the disclosure. The flowchart of the embodiment may correspond to the monitoring device 400 for physiological signal of FIG. 4. In step S602, the method involves providing a first light receiving and transmitting device to generate a first light signal to an object and receive a second light signal to generate a first electrical signal. In step S604, the method involves providing a second light receiving and transmitting device to generate a third light signal to the object and receive a fourth light signal to generate a second electrical signal. In step S606, the method involves using a control device to control the first light receiving and transmitting device to generate the first light signal in a first period. In step S608, the method involves using the control device to control the second light receiving and transmitting device to receive the fourth light signal to generate the second electrical signal in the first period.

In step S610, the method involves using the control device to control the second light receiving and transmitting device to generate the third light signal in the second period. In step S612, the method involves using the control device to control the first light receiving and transmitting device to receive the second light signal to generate the first electrical signal in a second period. In step S614, the method involves using a processing device to receive the first electrical signal and the second electrical signal and to use an algorithm to process the first electrical signal and the second electrical signal, so as to generate monitoring information. In the embodiment, the second light signal is generated, for example, by the object in response to the third light signal, and the fourth light signal is generated, for example, by the object in response to the first light signal. In addition, each of the first light receiving and transmitting device and the second light receiving and transmitting device is, for example, a single light-emitting diode with a light-detection function. Furthermore, the above algorithm includes, for example, a smoothing method, a filtering method, an anomaly detection method, a periodicity detection method, photoplethysmography, or an artificial intelligence algorithm.

It should be noted that the order of the steps of FIG. 5 and FIG. 6 is only for illustrative purpose, but not intended to limit the order of the steps of the disclosure. The user may change the order of the steps above according the requirement thereof. The flowcharts described above may add additional steps or use fewer steps without departing from the spirit and scope of the disclosure.

In summary, according to the monitoring device for physiological signal and the operation method thereof disclosed by the embodiments of the disclosure, the control device controls the first light receiving and transmitting device to generate the first light signal to the object in the first period, and controls the light receiving and transmitting device to receive the second light signal, so as to generate the first electrical signal. Therefore, the volume of the monitoring device for physiological signal monitoring may be effectively decreased and the convenience of use is increased. In addition, the embodiment of the disclosure further includes the processing device, and the processing device may process the above first electrical signal to generate monitoring information.

Furthermore, the embodiment of the disclosure may further include the second light receiving and transmitting device. In the first period, the control device controls the first light receiving and transmitting device to generate the first light signal to the object, and controls the second light receiving and transmitting device to receive the fourth light signal, so as to generate the second electrical signal. In addition, in the second period, the control device controls the second light receiving and transmitting device to generate the third light signal to the object, and controls the first light receiving and transmitting device to receive the second light signal, so as to generate the first electrical signal. Then, the processing device processes the above first electrical signal and the above electrical signal to generate the monitoring information. Therefore, the accuracy of monitoring may be increased.

While the disclosure has been described by way of example and in terms of the embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A monitoring device for physiological signal monitoring, comprising:
    a first light receiving and transmitting device, configured to generate a first light signal to an object and receive a second light signal to generate a first electrical signal; and
    a control device, configured to control the first light receiving and transmitting device to generate the first light signal and not receive the second light signal in a first period, and control the first light receiving and transmitting device to not generate the first light signal and receive the second light signal to generate the first electrical signal in a second period;
    wherein the second light signal is generated by the object in response to the first light signal;
    wherein the first light receiving and transmitting device is a single light-emitting diode with a light-detection function and does not comprise an additional single light detection element;
    wherein the control device comprises:
    an input/output pin, connected to the first light receiving and transmitting device;
    a receiving signal module, configured to receive the first electrical signal through the input/output pin in the second period;
    a transmitting signal module, configured to provide a transmitting driving signal in the first period;
    an output buffer, configured to receive and transmit the transmitting driving signal to the first light receiving and transmitting device through the input/output pin in the first period, such that the first light receiving and transmitting device to generate the first light signal;
    a first impedance element, having a first terminal and a second terminal, wherein the first terminal of the first impedance element is connected to a first reference voltage, and the second terminal of the first impedance element is connected to the output buffer, the receiving signal module and the input/output pin;
    a second impedance element, having a first terminal and a second terminal, wherein the first terminal of the second impedance element is connected to the second terminal of the first impedance element, and the second terminal of the second impedance element is connected to a second reference voltage;
    a protection unit, having a first terminal and a second terminal, wherein the first terminal of the protection unit is connected to the second terminal of the first impedance element, and the second terminal of the protection unit is connected to the second reference voltage;
    a first diode, having a first terminal and a second terminal, wherein the first terminal of the first diode is connected to the first reference voltage, and the second terminal of the first diode is connected to the second terminal of the first impedance element; and
    a second diode, having a first terminal and a second terminal, wherein the first terminal of the second diode is connected to the second terminal of the first diode, and the second terminal of the second diode is connected to the second reference voltage.

2. The monitoring device for physiological signal monitoring as claimed in claim 1, further comprising:
    a processing device, configured to receive the first electrical signal and to use an algorithm to process the first electrical signal, so as to generate monitoring information.

3. The monitoring device for physiological signal monitoring as claimed in claim 2, wherein the algorithm comprises a smoothing method, a filtering method, an anomaly detection method, a periodicity detection method, photoplethysmography, or an artificial intelligence algorithm.

4. The monitoring device for physiological signal monitoring as claimed in claim 1, further comprising:
    a second light receiving and transmitting device, configured to generate a third light signal to the object and receive a fourth light signal to generate a second electrical signal;

wherein the control device controls the second light receiving and transmitting device to receive the fourth light signal to generate the second electrical signal in the first period, and the control device controls the second light receiving and transmitting device to generate the third light signal in the second period.

5. The monitoring device for physiological signal monitoring as claimed in claim 4, wherein the second light signal is generated by the object in response to the third light signal, and the fourth light signal is generated by the object in response to the first light signal.

6. The monitoring device for physiological signal monitoring as claimed in claim 4, further comprising:
a processing device, configured to receive the first electrical signal and the second electrical signal and to use an algorithm to process the first electrical signal and the second electrical signal, so as to generate monitoring information.

7. The monitoring device for physiological signal monitoring as claimed in claim 6, wherein the algorithm comprises a smoothing method, a filtering method, an anomaly detection method, a periodicity detection method, or an artificial intelligence algorithm.

8. The monitoring device for physiological signal monitoring as claimed in claim 4, wherein each of the first light receiving and transmitting device and the second light receiving and transmitting device is the single light-emitting diode with the light-detection function.

9. The monitoring device for physiological signal monitoring as claimed in claim 1, wherein the first light receiving and transmitting device and the control device are configured to be disposed on an earphone or a watch.

10. The monitoring device for physiological signal monitoring as claimed in claim 1, wherein the receiving signal module comprises:
an analog input unit, connected to the input/output pin, configured to receive the first electrical signal through the input/output pin;
a diode, having a first terminal and a second terminal, wherein a first terminal of the diode is connected to the first reference voltage; and
a resistor, having a first terminal and a second terminal, wherein the first terminal of the resistor is connected to the second terminal of the diode, and the second terminal of the resistor is connected to the analog input unit.

11. The monitoring device for physiological signal monitoring as claimed in claim 1, wherein the transmitting signal module comprises:
an alternate function output unit, configured to provide the transmitting driving signal in the first period;
an output data register, configured to provide the transmitting driving signal in the first period; and
a multiplexer, connected to the alternate function output unit and the output data register, and configured to provide the transmitting driving signal output by the alternate function output unit or the output data register.

12. The monitoring device for physiological signal monitoring as claimed in claim 1, wherein the output buffer comprises:
an output control unit, connected to the transmitting signal module;
a first transistor, having a first terminal, a second terminal and a third terminal, wherein the first terminal of the first transistor is connected to the output control unit, the second terminal of the first transistor is connected to the first reference voltage; and
a second transistor, having a first terminal, a second terminal and a third terminal, wherein the first terminal of the second transistor is connected to the output control unit, the second terminal of the second transistor is connected to the second reference voltage, and the third terminal of the second transistor is connected to the third terminal of the first transistor.

13. An operation method of a monitoring device for physiological signal monitoring, comprising:
providing a first light receiving and transmitting device to generate a first light signal to an object and receive a second light signal to generate a first electrical signal;
using a control device to control the first light receiving and transmitting device to generate the first light signal and not receive the second light signal in a first period; and
using the control device to control the first light receiving and transmitting device to not generate the first light signal and receive the second light signal to generate the first electrical signal in a second period;
wherein the second light signal is generated by the object in response to the first light signal;
wherein the first light receiving and transmitting device is a single light-emitting diode with a light-detection function and does not comprise an additional single light detection element;
wherein the control device comprises:
an input/output pin, connected to the first light receiving and transmitting device;
a receiving signal module, configured to receive the first electrical signal through the input/output pin in the second period;
a transmitting signal module, configured to provide a transmitting driving signal in the first period;
an output buffer, configured to receive and transmit the transmitting driving signal to the first light receiving and transmitting device through the input/output pin in the first period, such that the first light receiving and transmitting device to generate the first light signal;
a first impedance element, having a first terminal and a second terminal, wherein the first terminal of the first impedance element is connected to a first reference voltage, and the second terminal of the first impedance element is connected to the output buffer, the receiving signal module and the input/output pin;
a second impedance element, having a first terminal and a second terminal, wherein the first terminal of the second impedance element is connected to the second terminal of the first impedance element, and the second terminal of the second impedance element is connected to a second reference voltage;
a protection unit, having a first terminal and a second terminal, wherein the first terminal of the protection unit is connected to the second terminal of the first impedance element, and the second terminal of the protection unit is connected to the second reference voltage;
a first diode, having a first terminal and a second terminal, wherein the first terminal of the first diode is connected to the first reference voltage, and the second terminal of the first diode is connected to the second terminal of the first impedance element; and
a second diode, having a first terminal and a second terminal, wherein the first terminal of the second diode is connected to the second terminal of the first diode, and the second terminal of the second diode is connected to the second reference voltage.

14. The operation method of the monitoring device for physiological signal monitoring as claimed in claim 13, further comprising:
using a processing device to receive the first electrical signal and to use an algorithm to process the first electrical signal, so as to generate monitoring information.

15. The operation method of the monitoring device for physiological signal monitoring as claimed in claim 14, wherein the algorithm comprises a smoothing method, a filtering method, an anomaly detection method, a periodicity detection method, or an artificial intelligence algorithm.

16. The operation method of the monitoring device for physiological signal monitoring as claimed in claim 13, further comprising:
providing a second light receiving and transmitting device to generate a third light signal to the object and receive a fourth light signal to generate a second electrical signal;
using the control device to control the second light receiving and transmitting device to receive the fourth light signal to generate the second electrical signal in the first period; and
using the control device to control the second light receiving and transmitting device to generate the third light signal in the second period.

17. The operation method of the monitoring device for physiological signal monitoring as claimed in claim 16, wherein the second light signal is generated by the object in response to the third light signal, and the fourth light signal is generated by the object in response to the first light signal.

18. The operation method of the monitoring device for physiological signal monitoring as claimed in claim 16, further comprising:
using a processing device to receive the first electrical signal and the second electrical signal and to use an algorithm to process the first electrical signal and the second electrical signal, so as to generate monitoring information.

19. The operation method of the monitoring device for physiological signal monitoring as claimed in claim 18, wherein the algorithm comprises a smoothing method, a filtering method, an anomaly detection method, a periodicity detection method, photoplethysmography, or an artificial intelligence algorithm.

20. The operation method of the monitoring device for physiological signal monitoring as claimed in claim 16, wherein the second light receiving and transmitting device is the single light-emitting diode with the light-detection function.

\* \* \* \* \*